UNITED STATES PATENT OFFICE 2,180,297

WATER-INSOLUBLE AZO DYESTUFFS AND FIBER DYED THEREWITH

Leopold Laska, Offenbach-on-the-Main, Arthur Zitscher, Kronberg in Taunus, and Rudolf Heil, Offenbach-on-the-Main, Germany, assignors to General Aniline Works, Inc., New York, N. Y., a corporation of Delaware No Drawing. Application August 11, 1937, Serial No. 158,618. In Germany August 12, 1936

12 Claims. (Cl. 260—204)

The present invention relates to water-insoluble azo dyestuffs and to fiber dyed therewith; more particularly, it relates to dyestuffs of the following general formula:

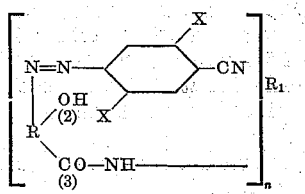

wherein $n$ stands for one of the numbers 1 and 2, the X's stand for substituents, R means a naphthalene, carbazole, benzocarbazole or anthracene nucleus and $R_1$ a radical of the benzene, naphthalene or diphenyl series.

We have found that valuable azo dyestuffs insoluble in water may be obtained by coupling in substance, on a fiber or on a substratum adapted for the production of lakes, the diazo compound of a 1-amino-4-nitrilobenzene substituted in 2- and 5-position with an ortho-hydroxyaryl-carboxylic acid arylamide, the dyestuff components not containing any solubilizing groups such as sulfonic acid or carboxylic acid groups.

When made in substance the new dyestuffs may be used for the preparation of valuable pigments; they are, however, also particularly suitable for the production of insoluble dyestuffs on the fiber, both native and regenerated cellulose fibers and animal fibers, by the ice color method or by one of the usual printing methods, for instance in direct printing or according to the known printing process with use of nitrosamines or diazoamino-compounds or the like.

Over comparable combinations described in U. S. Patent No. 1,759,259 the new dyestuffs have the advantage of an improved fastness to light.

The following examples serve to illustrate the invention, but they are not intended to limit it thereto:

(1) Well boiled, dried cotton yarn is impregnated with a solution containing per liter 4 grams of 1-(2'.3'-hydroxynaphthoylamino)-naphthalene, 10 cc. of caustic soda solution of 34° Bé. and 10 cc. of Turkey red oil of 50 per cent. strength, well squeezed and developed with a developing solution which has been rendered feebly acid with acetic acid and containing per liter the diazo compound from 1.82 grams of 1-amino-3-methoxy-6-chloro-4-nitrilobenzene, rinsed and soaped.

A blue-red dyeing of very good fastness to light is obtained.

By using 2.3-hydroxynaphthoyl-aminobenzene as grounding component a yellow-red dyeing likewise of very good fastness to light is obtained.

(2) Desized and bleached cotton piece goods are padded on a foulard with a solution containing per liter 15 grams of 2.3-hydroxynaphthoyl-aminobenzene, 22.5 cc. of caustic soda solution of 34° Bé. and 22.5 cc. of Turkey red oil. The impregnated and dried material is then passed through a developing solution which contains per liter the diazo-compound from 12 grams of 1-amino-2.5-dichloro-4-nitrilobenzene and is feebly acid with acetic acid. After a short passage through the air the material is rinsed several times with cold water and finally soaped, rinsed and dried as usual.

A yellow-red dyeing of very good fastness to light is obtained.

(3) Desized and bleached cotton piece goods are impregnated on a foulard with a padding solution prepared in the usual manner from 12 grams of 2.3-hydroxynaphthoyl-aminobenzene per liter and dried. The material is then printed with a red resist of the following composition: 8 grams of 1-amino-3-methyl-6-chloro-4-nitrilobenzene in the form of a stabilized diazonium compound, 310 grams of water, 150 grams of aluminium sulfate (1:1) and 500 grams of neutral starch-tragacanth thickening per kilo of printing color. After drying, the dyeing is developed with a solution containing per liter the diazonium chloride from 9 grams of 4-amino-4'-methoxy-diphenylamine and containing magnesium sulfate. After a short passage through the air the material is passed through a bath having a temperature of 50° C. and containing 15 cc. of a bisulfite solution of 38° Bé. per liter. The material is thoroughly rinsed hot and cold, soaped for a short time at boiling temperature, rinsed, soaped again, rinsed and dried.

A yellowish-red effect on a blue ground is obtained.

(4) 3 grams of 1-(2'.3'-hydroxynaphthoyl-amino)-2-methyl-4-chlorobenzene are dissolved with 4.5 cc. of caustic soda solution of 34° Bé. and 3 cc. of Turkey red oil of 50 per cent. strength with addition of one of the usual protective agents for silk, for instance 1.5 grams of purified sulfite cellulose waste liquor in the form of a powder, so as to produce 1 liter of padding solution.

Degummed spun silk is impregnated in this solution in a proportion of goods to liquor of 1:30, squeezed and then developed in a solution which has been rendered neutral to Congo paper by addition of sodium acetate and contains the acid diazonium sulfate from 2.2 grams of 1-amino-3-methoxy-6-trifluoromethyl-4-nitrilobenzene per liter, a small quantity of acetic acid being added for the coupling. The material is rinsed, acidified and soaped at boiling temperature. A yellow-red dyeing of very good fastness to light is obtained.

(5) Desized and bleached cotton piece goods are printed with the following paste:

|  | Grams |
|---|---|
| The potassium compound of 3-methyl-6-chloro-4-nitrilobenzene-1-nitrosamine (aqueous paste with a content of 44.9 per cent. of pure base and containing 4.2 per cent. of caustic potash) | 33 |
| 2.3-hydroxynaphthoyl-aminobenzene | 21 |
| Caustic soda solution of 34° Bé | 30 |
| Turkey red oil of 50 per cent. strength | 15 |
| and |  |
| Alcohol | 15 | are made into a paste with

| Chromate solution | 50 |
|---|---| dissolved with

| Warm water | 336 |
|---|---| and made up with

| Neutral starch-tragacanth thickening | 500 |
|---|---| to 1 kilo of printing color

After drying, the printed material is steamed for 3 minutes in the moist state or exposed to air over-night and subsequently passed through a bath having a temperature of 80° C.–90° C. and containing 20 grams of acetic acid of 50 per cent. strength per liter, rinsed and soaped.

A yellowish-red print of very good fastness to light is obtained.

Fast prints are also obtained by using according to known methods instead of the nitrosamine a suitable diazoamino-compound from 1-amino-3-methyl-6-chloro-4-nitrilobenzene.

(6) 16.7 parts by weight of 1-amino-3-methyl-6-chloro-4-nitrilobenzene are diazotized in the usual manner and the diazo-solution is coupled with a solution of 45.5 parts by weight of 1-(2'.3'-hydroxynapthoylamino)-2-methoxy-5-bromobenzene in dilute caustic soda solution to which there have been added the amount of sodium acetate sufficient for binding the excess of mineral acid, and Turkey red oil. The precipitated dyestuff is filtered with suction and washed well. When worked up with a substratum in the usual manner, advantageously in the form of a paste, it yields a red lake of a high degree of fastness to light.

(7) Pre-bleached linen piece goods are impregnated on a foulard with a solution containing per liter 20 grams of 1-(2'-hydroxycarbazole-3'-carbonylamino)-4-chlorobenzene-20 cc. of caustic soda solution of 34° Bé. and 30 cc. of Turkey red oil, well squeezed and dried. The dyeing is then developed on a foulard in a solution containing the diazonium chloride from 3.4 grams of 1-amino-2.5-dimethoxy-4-nitrilobenzene and aluminium sulfate. After developing, the material is rinsed, soaped, rinsed again and dried.

A reddish-brown dyeing of very good fastness to light is obtained.

The following table illustrates a number of combinations which may be prepared by this invention and the shades contained:

| Diazo-compound from— | Coupled with— | Shade |
|---|---|---|
| 1-amino-5-methyl-2-chloro-4-nitrilobenzene | 2'-hydroxynaphthalene-3'-carbonyl-1-aminonaphthalene | Bluish-red. |
| Do | 2-aminonaphthalene | Red. |
| Do | 1-amino-4-methoxy-benzene | Do. |
| Do | 1-amino-4-ethoxybenzene | Blue-red. |
| Do | 1-amino-2-methoxy-benzene | Bluish-red. |
| Do | 1-amino-2-ethoxybenzene | Yellowish-red. |
| Do | 1-amino-2-methyl-benzene | Do. |
| Do | 1-amino-4-methoxy-2-methylbenzene | Full red. |
| Do | 1-amino-2.4-dimethoxy-5-chlorobenzene | Red. |
| Do | 1-amino-2.5-dimethoxy-benzene | Yellowish-red. |
| Do | 1-amino-3-chlorobenzene | Do. |
| Do | 1-amino-4-methoxy-naphthalene | Brownish Bordeaux. |
| Do | 1-amino-2.4-dimethoxybenzene | Copper red. |
| Do | 1-amino-2.5-dimethoxy-4-chlorobenzene | Orange brown. |
| Do | 1-amino-2.4-dimethoxy-3-chlorobenzene | Yellow-red. |
| Do | 1-amino-4-methoxy-3-methylbenzene | Full red. |
| Do | 2'-hydroxy-6'-bromo-naphthalene-3'-(carbonyl-1-amino-2.4-dimethoxybenzene) | Brownish Bordeaux. |
| Do | 2'-hydroxycarbazole-3'-carbonyl-1-amino-4-chlorobenzene | Brown. |
| Do | 2'-hydroxy-6'-methoxynaphthalene-3'-(carbonyl-1-amino-2-methoxybenzene) | Currant. |
| 1-amino-5-methyl-2-bromo-4-nitrilobenzene | 2'-hydroxynaphthalene-3'-carbonyl-2-aminonaphthalene | Red. |
| Do | 1-amino-4-methoxybenzene | Do. |
| Do | 1-amino-4-chlorobenzene | Yellowish-red. |
| Do | 1-amino-2.5-dimethoxybenzene | Red. |
| Do | 1-amino-4-ethoxybenzene | Bordeaux. |
| Do | 1-amino-2-methoxy-5-bromobenzene | Yellowish-red. |
| Do | 2'-hydroxycarbazole-3'-carbonyl-1-amino-4-chlorobenzene | Reddish-brown. |
| 1-amino-5-methoxy-2-chloro-4-nitrilobenzene | 2'-hydroxynaphthalene-3'-carbonyl-1-amino-4-methoxybenzene | Full red. |
| Do | 1-amino-4-ethoxybenzene | Blue-red. |
| Do | 1-amino-2-methylbenzene | Bluish-red. |
| Do | 1-amino-2-methyl-4-cholorobenzene | Yellowish-red. |
| Do | 1-amino-2.5-dimethoxy-benzene | Blue-red. |
| Do | 2-aminonaphthalene | Red. |
| 1-amino-2-methoxy-5-chloro-4-nitrilobenzene | Aminobenzene | Do. |
| Do | 1-amino-2-methylbenzene | Wine-red. |
| Do | 1-amino-2-methoxybenzene | Blue-red. |
| Do | 1-amino-2-ethoxybenzene | Yellowish-red. |
| Do | 1-amino-4-methoxybenzene | Red. |
| Do | 1-amino-4-ethoxybenzene | Brownish-red. |
| Do | 1-amino-4-chlorobenzene | Red. |
| Do | 1-amino-2.5-dimethoxy-benzene | Wine-red. |
| Do | 1-amino-2-methyl-4-chlorobenzene | Red. |
| Do | 1-amino-2-methoxy-5-bromobenzene | Do. |
| Do | 1-aminonaphthalene | Bordeaux. |
| Do | 2-aminonaphthalene | Bluish-red. |
| Do | 2'-hydroxycarbazole-3'-carbonyl-1-amino-4-chlorobenzene | Yellowish-brown. |

| Diazo-compound from— | Coupled with— | Shade |
|---|---|---|
| 1-amino-5-ethoxy-2-chloro-4-nitrilobenzene | 2'-hydroxynaphthalene-3'-carbonyl-Aminobenzene | Yellow-red. |
| Do | 1-amino-3-chlorobenzene | Red. |
| Do | 1-amino-4-chlorobenzene | Yellowish-red. |
| Do | 1-amino-3-nitrobenzene | Red. |
| 1-amino-2-phenoxy-5-chloro-4-nitrilobenzene | Aminobenzene | Yellow-red. |
| Do | 1-amino-2-methoxybenzene | Do. |
| Do | 1-amino-2-ethoxybenzene | Do. |
| Do | 1-amino-4-methoxybenzene | Yellowish-red. |
| Do | 1-amino-4-ethoxybenzene | Do. |
| Do | 1-amino-2-methylbenzene | Red. |
| Do | 1-amino-3-nitrobenzene | Do. |
| Do | 1-amino-4-methoxy-2-methylbenzene | Do. |
| Do | 1-amino-2.4-dimethoxybenzene | Copper red. |
| Do | 1-amino-2.5-dimethoxybenzene | Red. |
| Do | 1-amino-2-methyl-4-chlorobenzene | Do. |
| Do | 2'-hydroxycarbazole-3'-carbonyl-1-amino-4-chlorobenzene | Reddish-brown. |
| 1-amino-2.5-dichloro-4-nitrolobenzene | 2'-hydroxynaphthalene-3'-carbonyl-1-amino-2-methoxybenzene | Red. |
| Do | 1-amino-2-ethoxybenzene | Yellowish-red. |
| Do | 1-amino-2-methylbenzene | Do. |
| Do | 1-amino-4-chlorobenzene | Do. |
| Do | 1-amino-3-chlorobenzene | Do. |
| Do | 1-amino-4-methoxybenzene | Brownish-red. |
| Do | 1-amino-3-nitrobenzene | Yellow-red. |
| Do | 2-aminonaphthalene | Red. |
| Do | 1-amino-2.5-dimethoxybenzene | Do. |
| Do | 1-amino-2-methoxy-5-bromobenzene | Yellowish-red. |
| Do | 1-amino-2-methyl-4-chlorobenzene | Do. |
| 1-amino-2.5-dimethyl-4-nitrilobenzene | Aminobenzene | Do. |
| Do | 1-amino-4-methoxybenzene | Bluish red. |
| Do | 1-amino-4-ethoxybenzene | Wine-red. |
| Do | 1-amino-4-methoxy-2-methylbenzene | Yellowish Bordeaux. |
| Do | 1-amino-2.4-dimethoxy-5-chlorobenzene | Do. |
| Do | 1-aminonaphthalene | Blue-red. |
| Do | 2-aminonaphthalene | Bluish red. |
| Do | 1-amino-4-methoxynaphthalene | Bordeaux. |
| Do | 2'-hydroxycarbazole-3'-carbonyl-1-amino-4-chlorobenzene | Brown. |
| 1-amino-5-methoxy-2-methyl-4-nitrilobenzene | 2'-hydroxynaphthalene-3'-carbonyl-1-amino-4-ethoxybenzene | Bordeaux. |
| Do | 1-amino-2.4-dimethoxy-5-chlorobenzene | Do. |
| Do | 2'-hydroxycarbazole-3'-carbonyl-1-amino-4-chlorobenzene | Yellowish brown. |
| 1-amino-2.5-dimethoxy-4-nitrilobenzene | 2'-hydroxynaphthalene-3'-carbonyl-Aminobenzene | Wine-red. |
| Do | 1-amino-4-chlorobenzene | Bluish Bordeaux. |
| Do | 1-amino-4-methoxy-3-methylbenzene | Do. |
| Do | 1-amino-2.4-dimethoxy-5-chlorobenzene | Bordeaux. |
| Do | 1-amino-4-methoxy-naphthalene | Violet. |
| Do | 2'-hydroxyanthracene-3'-carbonyl-1-amino-2-methylbenzene | Blue. |
| Do | Bz-2'-hydroxy-1.2-benzocarbazole-Bz-3'-(carbonyl-1-amino-4-methoxybenzene). | Reddish navy-blue. |
| 1-amino-5-methyl-2-diethylamino-sulfonyl-4-nitrilobenzene | 2'-hydroxynaphthalene-3'-carbonyl-1-amino-2.4-dimethoxy-benzene | Red-brown. |
| Do | 1-amino-2-methyl-4-chlorobenzene | Orange-red. |
| Do | 1-amino-2-methoxy-5-bromobenzene | Yellow-red. |
| Do | 2-aminonaphthalene | Yellowish red. |
| Do | 2'-hydroxy-6'-bromonaphthalene-3'-(carbonyl-1-amino-2.4-dimethoxybenzene) | Copper-brown. |
| 1-amino-5-methoxy-2-diethylamino-sulfonyl-4-nitrilobenzene | 2'-hydroxynaphthalene-3'-carbonyl-1-amino-2-methoxybenzene | Orange-red. |
| Do | 1-amino-3-chlorobenzene | Do. |
| Do | 1-amino-4-chlorobenzene | Yellow-red. |
| Do | 1-amino-2-methyl-4-chlorobenzene | Yellowish red. |
| 1-amino-5-methoxy-2-trifluoromethyl-4-nitrilobenzene | 1-amino-2-methylbenzene | Do. |
| Do | 1-amino-4-methoxybenzene | Brown-red. |
| Do | 1-amino-4-ethoxybenzene | Do. |
| Do | 1-amino-4-methoxy-3-methylbenzene | Reddish brown. |
| 1-amino-5-methoxy-2-trifluoromethyl-4-nitrilobenzene 2 mols. | 4.4'-di-(2''-hydroxynaphthalene-3''-carbonylamino)-3.3'-dimethoxy-diphenyl | Reddish brown. |
| 1-amino-2.5-diethoxy-4-nitrilobenzene | 2'-hydroxynaphthalene-3'-carbonyl-1-amino-2.5-dimethoxy-4-chlorobenzene | Bordeaux. |
| Do | 1-amino-4-methoxy-3-methylbenzene | Garnet. |
| 1-amino-2-methyl-5-chloro-4-nitrilobenzene | 1-amino-4-methoxy-2-methylbenzene | Red. |
| Do | 1-amino-2.4-dimethoxybenzene | Bordeaux. |
| Do | 2'-hydroxy-6'-bromonaphthalene-3'-(carbonyl-1-amino-2.4-dimethoxybenzene) | Brown garnet. |
| 1-amino-5-ethyl-2-chloro-4-nitrilobenzene | 2'-hydroxynaphthalene-3'-carbonyl-aminobenzene | Yellowish red. |
| Do | 1-amino-4-methoxybenzene | Red. |
| Do | 1-amino-2.5-dimethoxybenzene | Do. |
| 1-amino-5-methyl-2-methylsulfonyl-4-nitrilobenzene | 1-amino-4-methoxy-2-methylbenzene | Do. |
| Do | 1-amino-2.5-dimethoxy-benzene | Brownish red. |
| 1-amino-2-methoxy-5-dimethylaminosulfonyl-4-nitrilobenzene | 1-amino-4-methoxybenzene | Yellowish red. |
| Do | 1-amino-4-methoxy-3-methylbenzene | Brownish garnet. |

Since an object of the present invention is to provide dyestuffs of good fastness properties which dystuffs are insoluble in water and alkalies, it is to be understood that the aromatic nuclei of the general formulae appearing in the appended claims do not contain any substituents which are known to render organic compounds soluble in water or alkalies and to tend to depreciate the fastness of the dyestuffs to alkalies. Substituents of this kind are, for instance, the sulfonic acid and the carboxylic acid group.

We claim:
1. The water-insoluble azo dyestuffs of the following general formula:

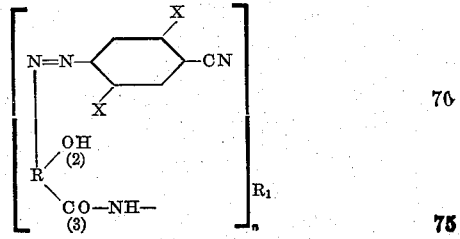

wherein n stands for one of the numbers 1 and 2, the X's stand for members of the group consisting of halogen, alkyl, alkoxy, phenoxy, trifluoromethyl, alkylsulfonyl and dialkylaminosulfonyl, R means a member of the group consisting of naphthalene, halogen substituted naphthalene, alkoxy substituted naphthalene, carbazole, benzocarbazole and anthracene, and R₁ a member of the group consisting of radicals of the benzene, naphthalene and diphenyl series, yielding, when produced on the fiber, orange to blue and brown dyeings of good fastness properties, particularly of very good fastness to light.

2. The water-insoluble azo dyestuffs of the following general formula:

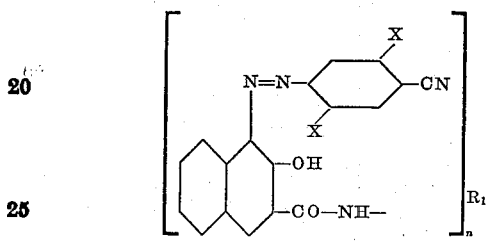

wherein n stands for one of the numbers 1 and 2, the X's stand for members of the group consisting of halogen, alkyl, alkoxy, phenoxy, trifluoromethyl, alkylsulfonyl and dialkylaminosulfonyl, and R₁ for a member of the group consisting of radicals of the benzene, naphthalene and diphenyl series, yielding, when produced on the fiber, orange to blue and brown dyeings of good fastness properties, particularly of very good fastness to light.

3. The water-insoluble azo dyestuffs of the following general formula:

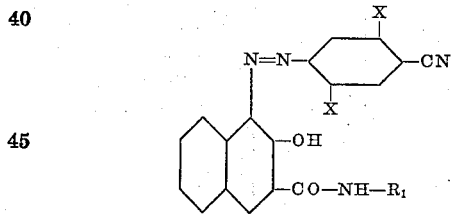

wherein the X's stand for members of the group consisting of halogen, alkyl, alkoxy, phenoxy, trifluoromethyl, alkylsulfonyl and dialkylaminosulfonyl and R₁ means a radical of the benzene series, yielding, when produced on the fiber, orange to blue and brown dyeings of good fastness properties, particularly of very good fastness to light.

4. The water-insoluble azo dyestuffs of the following formula:

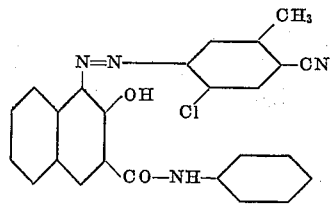

yielding, when produced on the fiber, yellowish-red dyeings of good fastness properties, particularly of very good fastness to light.

5. The water-insoluble azo dyestuff of the following formula:

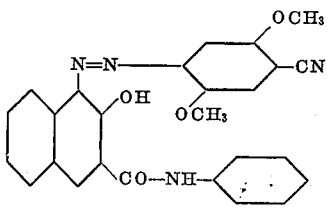

yielding, when produced on the fiber, wine-red dyeings of good fastness properties, particularly of very good fastness to light.

6. The water-insoluble azo dyestuff of the following formula:

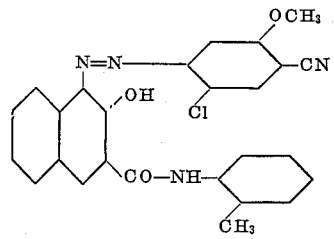

yielding, when produced on the fiber, bluish-red dyeings of good fastness properties, particularly of very good fastness to light.

7. Fiber dyed with the dyestuffs as claimed in claim 1.

8. Fiber dyed with the dyestuffs as claimed in claim 2.

9. Fiber dyed with the dyestuffs as claimed in claim 3.

10. Fiber dyed with the dyestuff as claimed in claim 4.

11. Fiber dyed with the dyestuff as claimed in claim 5.

12. Fiber dyed with the dyestuff as claimed in claim 6.

LEOPOLD LASKA.
ARTHUR ZITSCHER.
RUDOLF HEIL.